3,701,762
POLYALKENYLARENE COMPOSITIONS
Howard V. Holler, Oakland, Calif., assignor to Shell Oil Company, New York, N.Y.
No Drawing. Continuation-in-part of application Ser. No. 888,962, Dec. 29, 1969. This application July 19, 1971, Ser. No. 164,119
Int. Cl. C08f 7/02
U.S. Cl. 260—88.2 C    10 Claims

ABSTRACT OF THE DISCLOSURE

Compositions are disclosed comprising one or more polyalkenylarenes having at least three nuclear substituents each having at least three carbon atoms, and 0.01 to 10% by weight of certain acidic curing agents, which compositions may be cured at temperatures above 80° C. to useful castings, pottings, and laminates.

---

This case is a continuation-in-part of application Ser. No. 888,962, filed Dec. 29, 1969, now abandoned.

BACKGROUND OF THE INVENTION

The invention relates to curable compositions comprising polyalkenylarenes having at least three nuclear substituents of at least three carbon atoms and from 0.01 to 10.0% by weight on polyalkenylarene of certain acidic curing agents. The term polyalkenylarene hereinafter refers to an arene having at least three nuclear substituents, each having at least three carbon atoms and at least two of which are alkenyl. It is known from U.S. 2,591,587 to Mowry that polyalkenylarenes have been employed in small amounts as crosslinking agents in the preparation of ion exchange resins, as a modifier of synthetic rubber, in the preparation of hydrocarbon soluble resins and to improve the drying and bodying properties of drying oils.

Further, it is known from British Pat. 864,275 that polymerization of meta or para diisopropenylbenzenes with Friedel-Craft catalyst at temperatures above 80° C. result in a soluble, high melting polymer.

STATEMENT OF THE INVENTION

It has now been found that in the presence of certain acidic catalysts, compositions of certain polyalkenylarenes may be polymerized and cured to hard, insoluble, infusible resins having many desirable properties. The polyalkenylarene/catalyst compositions may, therefore, be employed advantageously in a wide variety of applications as, e.g., castings, laminates, potting materials, molding compounds, surface coatings, rigid foams and the like.

The invention relates to curable compositions of at least one polyalkenylarene with a curing amount of a highly acidic curing agent. The invention further relates to a method of curing the composition and to the cured composition.

DESCRIPTION OF THE PREFERRED EMBODIMENTS

According to the invention, a curable composition is provided comprising one or more polyalkenylarenes having at least three nuclear substituents each having at least three carbon atoms and from 0.01 to 10% by weight on the polyalkenylarene of an acidic curing agent. This acid curing agent or catalyst must have at least a minimum strength. It may be a protonic acid, (according to proton transfer theory, i.e., species capable of dissociating to yield a proton) or a Lewis acid (according to Lewis Theory of coordination, i.e., species capable of accepting unshared pairs of electrons). The proton acid catalyst must have a greater acidity than a protonic acid having a pKa value of less than 2, wherein pKa value is defined as the negative logarithm of the dissociation constant of an acid. Preferably, the acid agents employed should have an acidity at least as great as a protonic acid having a pKa of not more than about 1. Suitable protonic acids include, e.g., sulfuric acid, hydrochloric acid and hydrobromic acid. Preferred are protonic acids having a pKa of 1 or less which acids include organic acids. As defined herein organic acids contain at least one carbon atom in the molecular structure as exemplified by nonylbenzenesulfonic acid, trifluoroacetic acid, and trichloromethylphosphonic acid. Also suitable are esters and other acid derivatives which decompose or dissociate to strong acids above about 80° C., such as, e.g., cyclohexyl p-toluenesulfonate or benzyl p-toluenesulfonate and p-methoxybenzylchloride.

The requisite acidity of Lewis acids may be determined by conventional alkylation reactions. Generally, Lewis acids capable of effecting alkylation of phenol with propylene at 80° C. are suitable. Representative Lewis acid catalysts include ferric chloride, boron trifluoride, stannic tetrachloride, octyloxyaluminum dichloride and related species with an electron deficient central metal or metalloid atom such as are described in chapter IV of "Friedel-Crafts and Related Reactions," vol. 1, ed. by Olah, Academic Press, New York (1963). The most highly reactive Lewis acid catalysts may be most usefully employed as complexes with weak Lewis bases such as those containing a hetero atom which is nitrogen sulfur or phosphorus, e.g., amides such as dimethylformamide; nitriles such as acetonitrile; esters such as tributyl phosphate; thioethers and sulfides such as carbon disulfide; and phosphines such as tributyl phosphine and diphenyl phosphine.

Suitable polyalkenylarenes include 1,3,5-triisopropenylbenzene, 1,2,4-triisopropenylbenzene, 1-isopropyl-3,5-diisopropenylbenzene, 1-(3,5-diisopropyenylphenyl) - 1,3,3-trimethyl-5,7-diisopropenylindane, 1,3,5 - tris(1-methyl-1-propenyl) benzene, 1,2,4-tris(1-methyl-1-propenyl)-benzene, 1,3,5-tris($\alpha$-ethylvinyl) benzene and the like. Especially preferred are polyalkenylarenes having three hydrocarbon nuclear substituents, e.g., 1-isopropyl-3,5-diisopropenylbenzene, and 1,3,5-triisopropenylbenzene. The aromatic nuclei in the polyalkenylarene may bear nonhydrocarbon substituents such as, e.g., halogen and aryl ether, so long as they are relatively non-basic and do not neutralize or otherwise consume the acid curing catalyst. Preferred polyalkenylarenes having nuclear substituents on the ring containing 3 to 5 carbon atoms and bearing alkenyl unsaturation in conjugation with, that is $\alpha,\beta$ to the aromatic ring. Best results are obtained when the polyalkenylarene component of the composition according to the invention has an average of at least 2.3 alkenyl substituents per aromatic nucleus. Preferred are compositions containing at least 35% by weight of 1,3,5-triisopropenylbenzene. Particularly preferred are compositions wherein the monomer comprises at least 50% by weight of 1,3,5-triisopropenylbenzene; especially at least 90% by weight of 1,3,5-triisopropenylbenzene.

The amount of acid curing agent is usually within the range between 0.01 to 10% by weight on polyalkenylaromatic component, the preferred amounts lying between about 0.02 and 6% by weight. Generally, the larger amounts are required with weaker acids such as trichloroacetic acid. It is desirable to disperse the acidic curing agent throughout the polyalkenylarene in such a manner as to permit time for subsequent processing, e.g., casting, molding, laminating and the like, prior to gelation of the catalyzed material. Gelation and cure according to the method of the invention is required to obtain optimum resin properties.

When employing particularly strong acids such as sulfuric acid, acids in the solid phase such as ferric chloride, or gaseous acids such as phosphorous pentafluoride, it will often be necessary to attenuate the acid prior to addition to the polyalkenyarene to avoid gelation at the point of introduction, where the catalyst concentration is momentarily very high, and/or run-away exothermic cure soon after catalyst addition has been made. Advantageously, the very active catalyst are added in a volatile inert diluent which can be subsequently removed, e.g., by volatization under reduced pressure, prior to cure of the composition. Useful diluents include methylene chloride, pentane, diethyl ether and hexafluoroisopropanol. Removal of this diluent prior to the final cure generally results in superior thermoset properties in the castings. If desired, cross-linked foams may be obtained by allowing the diluent to vaporize during the cure. Thermoset foams can also be produced by incorporating a blowing agent which evolves nitrogen containing gas at cure temperatures such as azoisobutyric nitrile.

The complexing of the Lewis acid type catalyst with Lewis bases, is a very effective way of attenuating their activity. Since Lewis bases vary in strength, i.e., their ability to share an electron pair, the activity level of a strong Lewis acid catalyst can be attenuated to any desired level by proper selection of the complexing agent and its amount. Additional Lewis base complexing agents include those containing an oxygen atom, e.g., ethers such as diethyl ether, diphenyl ether and phenyl glycidyl ether; carboxylic acids such as acetic acid; alcohols such as methyl isobytyl carbinol; ketones such as cyclohexane; esters such as ethylacetate and the like. For Lewis acids which are insoluble or otherwise incompatible with the polyalkenylarene, the Lewis base may act as both a vehicle and homogenizer to facilitate mixing. Compatibility of protonic acid catalysts such as trichloromethylphosphonic acid may also be enhanced by the use of reactive diluents such as epoxides, e.g., phenyl glycidyl ether and octene epoxide, which remain in the final cured product. If a composition having a long "pot" life is desired, proton acids having a pKa between about 1 and 2 are preferred.

Another group of curing agents are salts which thermally decompose to yield strong Lewis acids, such as benzenediazonium hexafluorophosphate and p-chlorobenzene diazonium tetrafluoorborate. These salts are essentially neutral and may be mixed with the polyalkenylarene monomers at room temperature. However, at curing temperature, e.g., 100° C. and above, these salts decompose to generate the effective curing catalysts phosphorus pentafluoride and boron trifluoride, respectively.

Apart from the above two components (polyalkenylarene and acid curing agent) the compositions may contain further constituents such as silica, bitumen, coal tar, pigments, dyes, chopped fibers ceramic microbubbles, graphite fibers, continuous fiber, thermoplastic polymers such as polyvinyl chloride, rubbery polymers and copolymers such as polyisoprene or butadienestyrene, ethylenepropylene and the like. Such fillers may suitably be used to increase the viscosity of the compositions or render them thixotropic prior to cure. Without fillers the compositions have low viscosities making them especially suitable for intricate castings, impregnating porous, surfaces and the like. Properly selected fillers also serve to improve such properties as tensile strength, impact strength and the like and/or reduce the expense of the final cured compositions. The compositions may contain minor amounts, e.g., 1-20% w, of reactive diluents such as polyepoxides, prepared, e.g., by reaction of epichlorohydrin with bisphenol-A, dialkenyl arenes such as the diisopropenylbenzenes, mono and polyhydric phenols such as phenol, cresols, bisphenol-A, novolac resins, catechols and the like. Advantageously, such phenols accelerate the rate of gelation.

Suitable cure temperatures are in the range between about 80° C. and 300° C., preferably between 90° C. and 230° C. During the curing step, temperature control is required in order that the compositions according to the invention be properly cured. Cure of the compositions at temperatures below about 80° C. may result in premature gelation by means of addition polymerization of the alkenyl substituents resulting in cured compositions having great internal strains and susceptible to easy fracture. Cure of the compositions within the suitable range promotes formation of dimer linkages between alkenyl groups on the aromatic nuclei resulting in the excellent properties hereinafter described. The preferred dimer linkages formed by the reaction of each pendant alkenyl group on the aromatic nuclei can be schematically represented as follows:

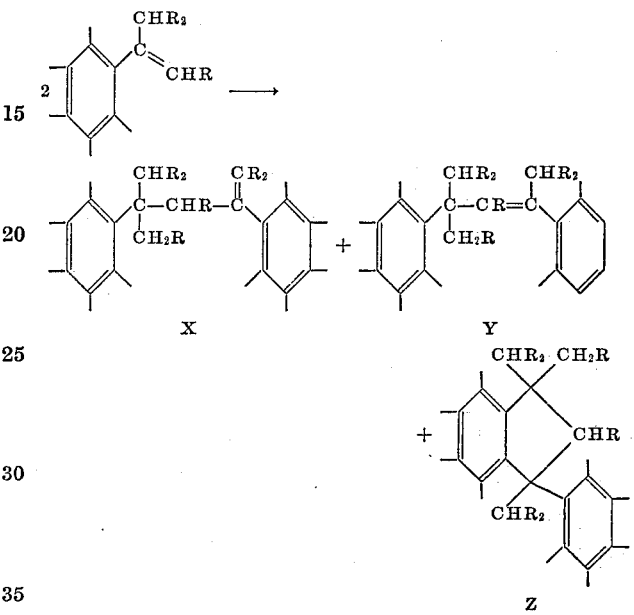

where $X+Y+Z=1$ and wherein R groups are hydrogen or alkyl. The ratio of $X:Y:Z$ in the resin will vary with particular cure conditions. Each pendant alkenyl group can by dimerization form only one cross-link bond to another nucleus. Thus, the potential functionality of monomer in forming cross-links to other structures can be twice as great for addition polymerization as for dimerization-type cross-linking. Though normally the high number of cross-links (cross-link density) in a resin is associated with such important properties as high heat distortion temperature and hardness, it has unexpectedly been found that the lower functionality provided by dimerization cross-linking must predominate to obtain good castings. Cure at progressively elevated temperatures may be utilized to develop properties of the cured thermoset compositions more fully; cure periods of from about 0.1 to 100 hours, preferably from 1 to 24 hours are suitable.

During the curing step, owing to formation of the dimer linkages, considerable shrinkage of the original monomer volume may be experienced, e.g., in the range up to about 10–12%, generally in the range from about 6 to about 10% volume.

For some applications such as, e.g., laminating and molding, it may be desirable to reduce such shrinkage of the cured product. This may be accomplished by fabricating a partially polymerized composition, or in other words, curing the composition in two stages. In the first stage, a composition according to the invention is heated to polymerize the composition to soluble resin having a molecular weight below about 5,000 by ebullioscopic determination, and having an average of from about 1 to 2, preferably from 1.2 to 1.7 double bonds per monomer derived unit, corresponding to from about 0.5 to about 1.0, preferably from about 0.6 to about 0.85 double bonds per 100 grams (based upon an average molecular weight of 200 for the monomer) as may be determined from conventional bromine number analysis. The resulting "B stage" resin which may be a viscous liquid or low melting solid, is soluble in non-polar solvents such as, e.g., heptane or CCl$_4$. Advantageously, the solid resin may be used to coat hot metal objects by dipping them into the powdered material. As much as one-half to three-quarters or more of the potential shrinkage can occur during this first stage, resulting in only small contraction on final and complete cure following fabrication.

The first stage polymerization may be carried out by heating the composition in bulk or inert diluent at a temperature in the range from about 80 to 120° C. until the desired molecular weight is obtained. Curing agents of moderate acidic activity, e.g., equivalent to a pKa of from about 1 to 2 are preferred as these allow more careful control of the progressive reaction. When the desired molecular weight is achieved, polymerization can be arrested by rapidly chilling the mixture to a temperature below 20° C. and/or neutralizing or otherwise removing the acid. The curing agent may be removed by extraction with basic agents such as, e.g., caustic soda and by filtration through alkaline media such as calcium carbonate, and the like. Heterogenous acid curing agents may be removed by conventional filtration, centrifugation and the like. The "B-stage" composition may be subsequently cured with the retained or additional curing agent at temperatures in the range between 80 and 300° C. The low volume shrinkage occurring during this final curing step is advantageous in preparing moldnigs to close dimension as well as resinous articles having little or no internal strain.

Depending upon the particular monomers and curing conditions employed, the cured products have desirable properties of clarity, hardness, high heat distortion temperature, good electrical resistance, good solvent resistance and the like. Almost colorless to light tan castings have been prepared from triisopropenylbenzenes. The compositions therefore have broad utility as castings, laminates, coatings, pottings, foams and the like.

The parts hereinafter refer to parts by weight unless otherwise indicated. The alkenylaromatic compositions employed in Examples I–VIII were found to contain a minor amount of an aliphatic material having a carbon number of about 15. Resin properties were determined by ASTM procedures.

Example I

A mobile liquid mixture comprising 91 parts of 1,3,5-triisopropenylbenzene, 5 parts 1-isopropyl-3,5-diisopropenylbenzene and 4 parts of the aliphatic material having a carbon number of about 15, and 6 parts of an attenuated catalyst mixture prepared from 3.3 parts of trifluoroacetic acid and 2.7 parts of phenyl glycidyl ether was cast between glass plates and cured 20 hours at 100° C. About 10% shrinkage occurred on curing. The resulting clear, crack free casting has a Barcol hardness of 35–40. The casting was exceptionally resistant to hydrocarbon solvents. On 24 hours soaking in toluene at room temperature, no softening was experienced, and only about 0.1% by weight of solvent was absorbed. The cured composition exhibited excellent thermal stability. A portion of the cured composition was placed within an electrically heated coil surrounded by an inert atmosphere of nitrogen, and was heated at a rate of 4° C. minute. The decomposition was continuously monitored on a Cahn electrobalance which measured the loss of weight of the heated sample. At about 430° C. the cured composition exhibited only 10% weight loss; at about 530° C. when the test was ended, 50% w. of cured resin remained.

Example II

A mixture of 84 parts of 1,3,5-triisopropenylbenezene, 12 parts of 1-isopropyl-3,5-triisopropenylbenzene, and 4 parts of an aliphatic material having a carbon number of about 15; and 10 parts of an attenuated catalyst comprising 6 parts trifluoroacetic acid and 4 parts of phneyl glycidyl ether was cured 21 hours at 110° C.

Properties of the cured resin included:

| | |
|---|---:|
| Barcol Hardness | 45 |
| Head Distortion temp.[1] | 142, 149° C. |
| Tensile strength, p.s.i. | 8,500 |
| Tensile modules, p.s.i. | 5.7×10$^5$ |
| Flexural strength, p.s.i. | 12,700 |
| Flexural modulus, p.s.i. | 5.7×10$^5$ |

[1] 264 p.s.i. fiber stress for all heat distortion values shown in this specification.

The clear casting showed neglible toluene uptake upon soaking in toluene for 24 hours at room temperature.

Example III

The procedure of Example II is repeated except that after first curing 20 hours at 110° C., the cure was continued for 20 hours at 180° C. The resulting product has a Barcol Hardness of 48 and a Heat distortion temeprature of 231° C.

Example IV

One hundred parts of the hydrocarbon monomer mixture used in Example II was mixed with 10 parts of a catalyst mixture consisting of 1 part stannic chloride in 9 parts of diphenyl ether. The mixture was cast immediately and quickly exothermed to about 100° C. without any external heating. Upon cooling, the resulting composition had a Barcol Hardness of 27.

Example V

A mobile liquid mixture of 2000 parts of a polyalkenyl-aromatic mixture comprising about 37% by weight 1,3,5-triisopropenylbenzene and about 55% 1-isopropyl-3,5-diisopropenylbenzene and about 8% w. of the aliphatic impurity of carbon number near 15 and 32 parts of an attenuated catalyst mixture comprising 48 parts of trifluoroacetic acid and 34 parts of phenyl glycidyl ether was stored at room temperature. After four months the uncured composition had a viscosity approximately that of glycerol.

The initial mobile composition after curing 20 hours at 110° C. results in a hard clear resin having the following properties:

| | |
|---|---:|
| Barcol Hardness | 35 |
| Izod impact strength, ft. lbs./inch of notch | 0.2 |
| Tensile strength, p.s.i. | 8,700 |
| Tensile modulsu, p.s.i. | 4.6×10$^5$ |
| Flexural strength, p.s.i. | 13,000 |
| Flexural modulus, p.s.i. | 4.6×10$^5$ |

Example VI

This example illustrates a method of preparing a partially polymerized composition, the so-called B-stage resin.

To 100 parts of one percent solution of trichloromethylphosphonic acid in 1,1,2-trichloroethane were added to a mixture of about 84 parts of 1,3,5-triisopropenylbenzene, 12 parts of 1 - isopropyl - 1,3,5-diisopropenylbenzene and 4 parts of the aliphatic material of carbon number near 15 at room temperature. The temperature of the mixture was quickly raised to about 80° C. over about 3 minutes, whereupon it exothermed to about 100° C. The mixture was then rapidly cooled to about −80° C. by cooling in Dry Ice and adding an equal volume of cold methylene chloride. The resulting solution was filtered to remove part of the acid catalyst which was not very soluble in the cold mixture. The filtrate was vacuum stripped at about 100 mm. Hg and room temperature, resulting in an amorphous solid having a molecular weight of 4200 and about 0.67 double bonds per 100 grams as determined by bromine number. Clear castings prepared by curing the above solid for an hour at 110° C. exhibited shrinkage of less than a percent.

Example VII

Another method of preparing a partially polymerized composition is as follows:

One part of an attenuated acid catalyst consisting of equimolar amounts of trichloromethylphosphonic acid and phenyl glycidyl ether was added with stirring to 300 parts of polyalkyenylarene blend of about 68% w. of 1,3,5-triisopropenylbenzene and 16% w. of 1-isopropyl-3,5-diisopropenylbenzene and 16% w. of aliphatic material having a carbon number of about 15 at room temperature, and the whole heated to 70–75° C. The viscosity of the composition increased slowly. After about one-half hour at 70–75° C. the mixture was rapidly chilled with ice water to about 20° C. Having reduced solubility at this temperature, most of the acid catalyst employed precipitated from which the partially polymerized composition was decanted. The partially polymerized product was a pale yellow liquid of about 100 poise viscosity having an ebullioscopic molecular weight of about 460 and about 0.79 double bonds per 100 grams as determined by bromine number. No increase in viscosity of the composition was observed on storage at room temperature in excess of three weeks. Subsequent cure with additional acid catalyst yielded hard, clear castings.

Example VIII

To 14,000 parts of a mixture of about 91% w. 1,3,5-triisopropenylbenzene, 5% w. 1-isopropyl - 3,5 - diisopropenylbenzene and 4% w. of an aliphatic impurity having a carbon number of about 15, was added a mixture of 1.4 parts of a boron trifluoride-diethyl ether equimolar complex diluted in 70 parts of diethyl ether; after mixing, the latter diluent was stripped at room temperature to final vacuum of about 1 mm. absolute. The stripped mixture was cured for 16 hours at 110° C. and post cured for 16 hours at 180° C. The resulting cured composition gave a clear colorless casting having a heat distortion temperature above the maximum of 260° C. which could be measured by the instrument employed. Excellent hardness and electrical properties were as follows:

| | |
|---|---|
| Barcol hardness | 54. |
| Volume resistivity, ohm-cm. | $1.0 \times 10^{18}$ at 1 minute. |
| Volume resistivity, ohm-cm. | $2.0 \times 10^{18}$ at 2 minutes. |
| Dielectric constant [1] | 2.49. |
| Dissipation factors [1] | 0.0011. |

[1] Tested at 100 cycles/sec. at 23° C. with 50% relative humidity.

This casting absorbed negligible toluene after soaking several days at 25° C.

Example IX

The following experiments were conducted with free radical catalysts, i.e., not according to the invention.

Thirteen grams of 98% w. 1,3,5-triisopropenylbenzene, 2% w. 1,3-diisopropenyl-5-isopropylbenzene, which had been passed over basic alumina followed by silica gel in a chromatographic column under nitrogen to remove inhibitory substances, were mixed with 0.30 g. of benzoyl peroxide. This mixture was sealed into a nitrogen flushed bottle which was placed in an oven at 104° C. for 3 days (over 100 half lives for the peroxide). No change in the appearance or viscosity of the monomer was observed.

Thirteen grams of the above monomer mixture was vacuum distilled to free it from potentially inhibitory substances and put into a glass vessel with 0.40 g. of azobisisobutyronitrile initiator. The mixture was boiled under high vacuum briefly to degas, was frozen with liquid nitrogen, and the vessel was repeatedly flushed with nitrogen before sealing under vacuum. This sealed vessel was placed in an oven at 60° C. for 40 hours. The only observable change in the tube change was a slight increase in viscosity.

Example X

To illustrate the importance of cure temperature for the compositions according to the invention the following example is provided.

Seventeen grams of a mixture of 98% w. 1,3,5-triisopropenylbenzene and 2% w. 1,3 - diisopropenyl - 5 - isopropylbenzene was mixed at room temperature with 0.18 g. of catalyst consisting of $SnCl_4$ and methyl isobutylcarbinol in a 1:4 molar ratio. This mixture was cast into two 11 mm. I.D. cylindrical glass tubes. One of these was allowed to cure at room temperature and the other was placed in an oven at 100° C. The room temperature sample slowly increased in viscosity and reached about 100 poises in 5 hours; at 1 day it was a very stiff gum. This room temperature tube became progressively harder and in between 4 and 5 days the casting in the tube spontaneously underwent brittle fracture longitudinally. The strains developed in this casting were such that the thin walled glass tube mold was simultaneously cracked. The clear colorless resin after 5 days cure at room temperature was hard but too brittle to allow testing for Barcol hardness. A sample of this resin cured at room temperature and placed in toluene, swelled and disintegrated.

The portion of the same catalyzed monomer mixture which was cured in the 100° C. oven quickly gelled and was reasonably hard within 15 minutes. After 3 days at 100° C. the casting was clear and very pale tan; it had shrunk away from the glass mold slightly and was easily removed. The casting had a Barcol hardness of 40 and showed no tendency to crack during the test. A sample of the casting which was soaked 1 day in toluene imbibed less than 0.03% w. toluene and no change in appearance was observed.

I claim is my invention:

1. A method for preparing hard, insoluble, infusible resins which comprises heating a mixture comprising (a) a polyalkenylarene component comprising at least one polyalkenylarene having at least three nuclear substituents each having at least three carbon atoms, said polyalkenylarene component having an average of at least 2.3 alkenyl substituents per aromatic nucleus and bearing the alkenyl unsaturation in conjugation with the aromatic ring and (b) from 0.1 to 10% by weight of an acid curing agent having an acidity greater than a protonic acid having a pKa value of 2, at a temperature from 80 to 300° C. from 0.1 to 100 hours.

2. A method according to claim 1 comprising the following steps (a) heating said composition at a temperature of at least about 80° C. for a time sufficient to obtain a hydrocarbon-soluble product having a molecular weight of less than about 5,000 and having from about 1.0 to 2.0 double bonds per monomer unit, and (b) subsequently curing said hydrocarbon-soluble product to a hydrocarbon insoluble, infusible material at a temperature between 80° C. and 300° C.

3. A method according to claim 1 wherein the curing agent is an organic acid.

4. A composition comprising (1) a polylakenylarene component comprising at least one polyalkenylarene having at least three nuclear substituents each having at least three carbon atoms; said polyalkenylarene component having an average of at least 2.3 alkenyl substituents per aromatic nucleus, and bearing the alkenyl unsaturation in conjugation with the aromatic ring and (2) a curing amount of an acid curing agent having an acidity greater than a protonic acid having a pKa value of 2.

5. A composition according to claim 4 wherein the polyalkenylarene is at least 35% by weight of 1,3,5-triisopropenylbenzene.

6. A composition according to claim 5 wherein the polyalkenylarene is a mixture of triisopropenylbenzene and isopropyl-diisopropenylbenzene.

7. A composition according to claim 4 wherein the acid curing agent is an organic acid.

8. A composition according to claim 4 cured at a temperature between 80° and 300° C.

9. A method according to claim 1 wherein the acid curing agent is a Lewis acid catalyst complexed with a weak Lewis base containing a hetero atom selected from the group consisting of nitrogen, sulfur and phosphorus.

10. A composition according to claim 4 wherein the nuclear substituents on said polyalkenylarene contain 3 to 5 carbon atoms.

References Cited

UNITED STATES PATENTS

| | | | |
|---|---|---|---|
| 2,542,551 | 2/1951 | McKeever | 260—673.5 |
| 3,238,077 | 3/1966 | Clark | 156—60 |
| 3,335,119 | 8/1967 | D'Alelio | 269—89.1 |

OTHER REFERENCES

Chemical Abstracts, vol. 46, 6424h Trialkenyl benzene.

JAMES A. SEIDLECK, Primary Examiner

R. S. BENJAMIN, Assistant Examiner

U.S. Cl. X.R.

260—80.78, 87.5 R, 91.1 A, 91.5, 93.5 S, 41 RC, 887, 892, 896, 897